US012772082B2

(12) United States Patent
Laddu et al.

(10) Patent No.: US 12,772,082 B2
(45) Date of Patent: Oct. 20, 2026

(54) CONFIGURATION OF BEAM FAILURE DETECTION IN CELLULAR COMMUNICATION NETWORKS

(71) Applicant: Nokia Technologies Oy, Espoo (FI)

(72) Inventors: Keeth Saliya Jayasinghe Laddu, Espoo (FI); Timo Koskela, Oulu (FI)

(73) Assignee: Nokia Technologies Oy, Espoo (FI)

( * ) Notice: Subject to any disclaimer, the term of this patent is extended or adjusted under 35 U.S.C. 154(b) by 382 days.

(21) Appl. No.: 18/547,776

(22) PCT Filed: Apr. 1, 2021

(86) PCT No.: PCT/EP2021/058722

§ 371 (c)(1),
(2) Date: Aug. 24, 2023

(87) PCT Pub. No.: WO2022/207117

PCT Pub. Date: Oct. 6, 2022

(65) Prior Publication Data

US 2024/0129772 A1 Apr. 18, 2024

(51) Int. Cl.
*H04W 24/08* (2009.01)
*H04L 5/00* (2006.01)

(52) U.S. Cl.
CPC ........... *H04W 24/08* (2013.01); *H04L 5/0053* (2013.01); *H04L 5/0091* (2013.01)

(58) Field of Classification Search
CPC .... H04W 24/08; H04L 5/0053; H04L 5/0091; H04L 5/0051; H04L 5/0044; H04L 5/0048; H04L 5/0096; H04B 7/0617; H04B 7/022
See application file for complete search history.

(56) References Cited

U.S. PATENT DOCUMENTS

2021/0014022 A1 1/2021 Yang

FOREIGN PATENT DOCUMENTS

JP 2024507063 A * 2/2024 ......... H04B 7/06964
JP 7594764 B2 * 12/2024 ............ H04W 24/08
(Continued)

OTHER PUBLICATIONS

Machine Translation of WO 2022152180 A1 (Year: 2021).*
(Continued)

*Primary Examiner* — Khaled M Kassim
*Assistant Examiner* — Noah James Sugden
(74) *Attorney, Agent, or Firm* — Lippes Mathias LLP

(57) ABSTRACT

According to an example aspect of the present disclosure, there is provided a method comprising determining, by a user equipment, that the user equipment is configured or activated with at least two Transmission Configuration Indication, TCI, states for one control resource set, with at least two linked search space sets and one TCI state for each of the linked search space sets or with at least two TCI states for Physical Downlink Shared Channel, PDSCH, reception, wherein the at least two TCI states comprise a first TCI state and a second TCI state, determining, by the user equipment, that a downlink reference signal indicated by the first TCI state is to be included to a first set of Beam Failure Detection, BFD, resources and a downlink reference signal indicated by the second TCI state is to be included to a second set of BFD resources and including, by the user equipment, the downlink reference signal indicated by the first TCI state to the first set of BFD resources and the downlink reference signal indicated by the second TCI state to the second set of BFD resources.

19 Claims, 4 Drawing Sheets

(56) References Cited

FOREIGN PATENT DOCUMENTS

| | | | | | |
|---|---|---|---|---|---|
| WO | 2020/054074 | A1 | | 3/2020 | |
| WO | 2020/246014 | A1 | | 12/2020 | |
| WO | 2021/034672 | A1 | | 2/2021 | |
| WO | WO-2022152180 | A1 | * | 7/2022 | ........... H04L 1/1854 |

OTHER PUBLICATIONS

Machine Translation of JP 7594764B2 (Year: 2021).*
Machine Translation of JP 2024507063 A (Year: 2021).*
"New WID: Further enhancements on MIMO for NR", 3GPP TSG RAN Meeting #86, RP-193133, Agenda: 9.1.1, Samsung, Dec. 9-12, 2019, 5 pages.
"3rd Generation Partnership Project; Technical Specification Group Radio Access Network; NR; Radio Resource Control (RRC) protocol specification (Release 16)", 3GPP TS 38.331, V16.3.1, Jan. 2021, pp. 1-932.
"3rd Generation Partnership Project; Technical Specification Group Radio Access Network; NR; Physical layer procedures for control (Release 16)", 3GPP TS 38.213, V16.4.0, Dec. 2020, pp. 1-181.
"Beam failure detection and beam recovery actions", 3GPP Tsg-Ran WG1 Meeting #88bis, R1-1705893, Agenda: 8.1.2.2.2, Ericsson, Apr. 3 - 7, 2017, pp. 1-5.
International Search Report and Written Opinion received for corresponding Patent Cooperation Treaty Application No. PCT/EP2021/058722, dated Dec. 23, 2021, 17 pages.
"Enhancements on Multi-TRP for PDCCH, PUCCH and PUSCH", 3GPP TSG RAN WG1 #104-e, R1-2100422, Agenda: 8.1.2.1, vivo, Jan. 25-Feb. 5, 2021, 28 pages.
"Enhancement on beam management for Multi-TRP", 3GPP TSG RAN WG1 #104-e, R1-2101095, Agenda: 8.1.2.3, Xiaomi, Jan. 25-Feb. 5, 2021, 5 pages.
"Enhancements for HST-SFN deployment", 3GPP TSG RAN WG1 #105-e Meeting, R1-2105276, Agenda: 8.1.2.4, Nokia, May 19-27, 2021, 13 pages.
Office action received for corresponding European Patent Application No. 21716722.0, dated Dec. 19, 2025, 4 pages.

* cited by examiner

CONFIGURATION OF BEAM FAILURE DETECTION IN CELLULAR COMMUNICATION NETWORKS

RELATED APPLICATION

This application was originally filed as PCT Application No. PCT/EP2021/058722 on Apr. 1, 2021, which is incorporated herein by reference in its entirety.

FIELD

Various example embodiments relate in general to cellular communication networks and more specifically, to configuration of beam failure detection in such networks.

BACKGROUND

Beam failure detection may refer to a set of functionalities that can be used to enhance operation of beam-based wireless communication systems. Beam failure detection may be used for example in various cellular communication networks, such as, in cellular communication networks operating according to 5G radio access technology. 5G radio access technology may also be referred to as New Radio, NR, access technology. 3rd Generation Partnership Project, 3GPP, develops standards for 5G/NR and one of the topics in the 3GPP discussions is related to beam failure detection. According to the discussions, there is a need to provide improved methods, apparatuses and computer programs related to beam detection. Such improvements may be used in other suitable cellular communication networks as well.

SUMMARY

According to some aspects, there is provided the subject-matter of the independent claims. Some embodiments are defined in the dependent claims.

The scope of protection sought for various embodiments of the disclosure is set out by the independent claims. The embodiments and features, if any, described in this specification that do not fall under the scope of the independent claims are to be interpreted as examples useful for understanding various embodiments of the disclosure.

According to a first aspect, there is provided a method comprising, determining, by a user equipment, that the user equipment is configured or activated with at least two Transmission Configuration Indication, TCI, states for one control resource set, with at least two linked search space sets and one TCI state for each of the linked search space sets or with at least two TCI states for Physical Downlink Shared Channel, PDSCH, reception, wherein the at least two TCI states comprise a first TCI state and a second TCI state, determining, by the user equipment, that a downlink reference signal indicated by the first TCI state is to be included to a first set of Beam Failure Detection, BFD, resources and a downlink reference signal indicated by the second TCI state is to be included to a second set of BFD resources and including, by the user equipment, the downlink reference signal indicated by the first TCI state to the first set of BFD resources and the downlink reference signal indicated by the second TCI state to the second set of BFD resources. The method may be performed by the user equipment or a control device configured to control the functioning thereof, possibly when installed therein.

Embodiments of the first aspect may comprise at least one feature from the following bulleted list or any combination of the following features:

- determining, by the user equipment, that a Quasi Co-Location, QCL, type comprising spatial receiver parameters is to be included to the first and the second sets when at least two QCL source reference signals are configured for the at least two TCI states;
- determining, by the user equipment, that the user equipment is configured with the at least two TCI states for each of at least two control resource sets and determining, by the user equipment, that the downlink reference signal indicated by the first TCI state is to be included to the first set of BFD resources of each of the at least two control resource sets and the downlink reference signal indicated by the second TCI state is to be included to the second set of BFD resources of each of the at least two control resource sets;
- receiving, by the user equipment, a first indication indicating that the downlink reference signal indicated by the first TCI state is to be included to the first set of BFD resources and a second indication indicating that the downlink reference signal indicated by the second TCI state is to be included to the second set of BFD resources;
- determining, by the user equipment, that the downlink reference signal indicated by the first TCI state is to be included to the first set of BFD resources and the downlink reference signal indicated by the second TCI state is to be included to the second set of BFD resources when the downlink reference signals have different source reference signals;
- monitoring for beam failure detection using the first and the second set;
- receiving, by the user equipment, a configuration configuring the user equipment to determine that the downlink reference signal indicated by the first TCI state is to be included to the first set of BFD resources and the downlink reference signal indicated by the second TCI state is to be included to the second set of BFD resources;
- determining, by the user equipment, that a configuration for multiple sets of BFD resources is configurable, determining, by the user equipment, that the user equipment is not configured to include the first and the second downlink reference signals to said multiple sets and including the first and the second downlink reference signals to the first set or to the second set;
- determining, after being configured with the at least two TCI states, that the user equipment is configured with one TCI state for the one control resource set and removing the downlink reference signal indicated by the second TCI state from the second set of BFD resources;
- determining, by the user equipment, that the user equipment is configured or activated with the at least two TCI states for PDSCH reception, determining, by the user equipment, a lowest TCI codepoint that indicates the at least two TCI states for PDSCH reception and determining, by the user equipment, that the downlink reference signal indicated by the first TCI state of the lowest TCI codepoint that indicates the at least two TCI states is to be included to the first set of BFD resources and the downlink reference signal indicated by the second TCI state of the lowest TCI codepoint that indicates the at least two TCI states is to be included to the second set of BFD resources;

determining, by the user equipment, that the downlink reference signal indicated by the first TCI state of another TCI codepoint that indicates the at least two TCI states is to be included to the first set of BFD resources and the downlink reference signal indicated by the second TCI state of said another TCI codepoint that indicates the at least two TCI states is to be included to the second set of BFD resources;

wherein said another TCI codepoint is a second lowest TCI codepoint that indicates the at least two TCI states;

determining, by the user equipment, that the user equipment is configured or activated with the two linked search space sets, determining, by the user equipment, associated TCI states corresponding to the two linked search space sets, wherein each search space set is associated with a control resource set, determining, by the user equipment, that the downlink reference signal indicated by the TCI state of the control resource set corresponds to a lower search space set identity or control resource set identity among linked search space sets and is to be included in the first set of BFD resource and determining, by the user equipment, that the downlink reference signal indicated by the TCI state of the control resource set corresponds to a higher search space set identity or control resource set identity among linked search space sets and is to be included in the second set of BFD resources;

determining, by the user equipment, that the user equipment is configured or activated with the at least two TCI states for the one control resource set in a multi-TRP, mTRP, Physical Downlink Control Channel, PDCCH, Single Frequency Network, SFN, scenario, determining, by the user equipment, that the user equipment is configured or activated with the at least two linked search space sets and one TCI state for each of the linked search space set in a mTRP PDCCH non-SFN scenario or determining, by the user equipment, that the user equipment is configured or activated or with the at least two TCI states in a PDSCH mTRP scenario;

determining, by the user equipment, BFD reference signals jointly when deriving more than one BFD reference signal per TRP.

According to a second aspect of the present disclosure, there is provided an apparatus comprising at least one processing core, at least one memory including computer program code, the at least one memory and the computer program code being configured to, with the at least one processing core, cause the apparatus at least to, determine, by a user equipment, that the user equipment is configured or activated with at least two Transmission Configuration Indication, TCI, states for one control resource set, with at least two linked search space sets and one TCI state for each of linked search space sets or with at least two TCI states for Physical Downlink Shared Channel, PDSCH, reception, wherein the at least two TCI states comprise a first TCI state and a second TCI state, determine, by the user equipment, that a downlink reference signal indicated by the first TCI state is to be included to a first set of Beam Failure Detection, BFD, resources and a downlink reference signal indicated by the second TCI state is to be included to a second set of BFD resources and include, by the user equipment, the downlink reference signal indicated by the first TCI state to the first set of BFD resources and the downlink reference signal indicated by the second TCI state to the second set of BFD resources. The apparatus of the second aspect may be a user equipment or a control device configured to control the functioning thereof, possibly when installed therein. The at least one memory and the computer program code may be further configured to, with the at least one processing core, cause the apparatus at least to perform the method of the first aspect.

According to a third aspect of the present disclosure, there is provided an apparatus comprising means for determining, by a user equipment, that the user equipment is configured or activated with at least two Transmission Configuration Indication, TCI, states for one control resource set, with at least two linked search space sets and one TCI state for each of the linked search space sets or with at least two TCI states for Physical Downlink Shared Channel, PDSCH, reception, wherein the at least two TCI states comprise a first TCI state and a second TCI state, means for determining, by the user equipment, that a downlink reference signal indicated by the first TCI state is to be included to a first set of Beam Failure Detection, BFD, resources and a downlink reference signal indicated by the second TCI state is to be included to a second set of BFD resources and means for including, by the user equipment, the downlink reference signal indicated by the first TCI state to the first set of BFD resources and the downlink reference signal indicated by the second TCI state to the second set of BFD resources. The apparatus of the third aspect may be a user equipment or a control device configured to control the functioning thereof, possibly when installed therein. The apparatus may further comprise means for performing the method of the first aspect.

According to a fourth aspect of the present disclosure, there is provided non-transitory computer readable medium having stored thereon a set of computer readable instructions that, when executed by at least one processor, cause an apparatus to at least perform the method of the first aspect. According to a fifth aspect of the present disclosure, there is provided a computer program comprising instructions which, when the program is executed by an apparatus, cause the apparatus to carry out the method of the first aspect.

EMBODIMENTS

Figure 1:
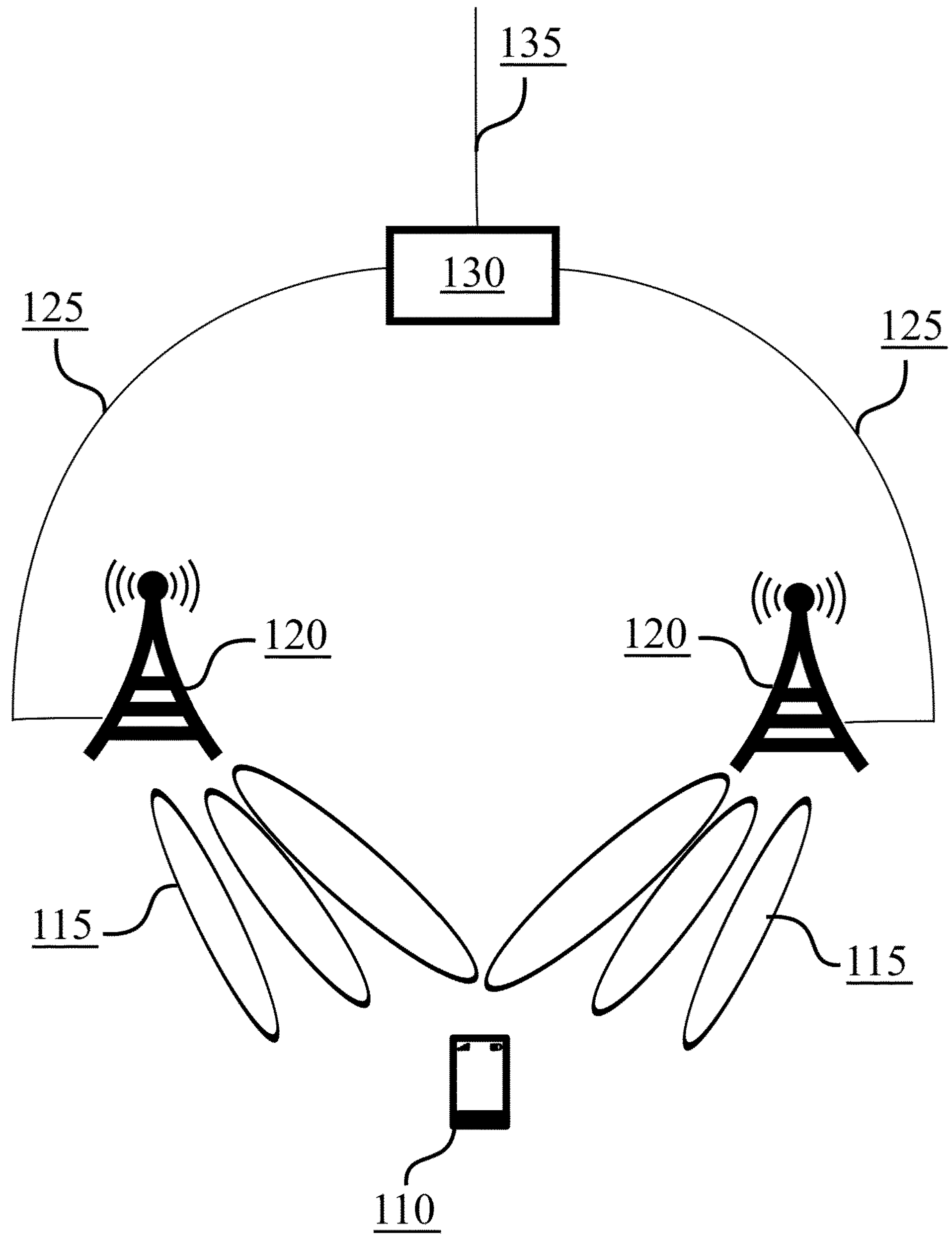
FIG. 1 illustrates an exemplary network scenario in accordance with at least some embodiments.

FIG. 1 illustrates an exemplary network scenario in accordance with at least some embodiments. According to the example scenario of FIG. 1, there may be a beam-based wireless communication system, which comprises User Equipment, UE, 110, at least two Base Stations, BSs, 120, and core network element 130. UE 110 may be connected to BS 120 via air interface using beams 115. BS 120 may be a network entity that configures some or all control information of UE 110 and allocates resources for UE 110. In some embodiments, BS 120 may refer to a Transmission and Reception Point, TRP, or comprise multiple TRPs that may be co-located or non-co-located. That is, FIG. 1 demonstrates a multi-TRP, mTRP, scenario when BSs 120 are considered as TRPs.

UE 110 may comprise, for example, a smartphone, a cellular phone, a Machine-to-Machine, M2M, node, Machine-Type Communications, MTC, node, an Internet of Things, IoT, node, a car telemetry unit, a laptop computer, a tablet computer or, indeed, another kind of suitable wireless terminal. In the example system of FIG. 1, UE 110 may communicate wirelessly with a cell of BS 120 via at least one beam 115. BS 120 may be considered as a serving BS for UE 110 and the cell of BS 120 may be a serving cell for UE 110. Air interface between UE 110 and BS 120 may be configured in accordance with a Radio Access Technology, RAT, which both UE 110 and base station 120 are configured to support.

Examples of cellular RATs include Long Term Evolution, LTE, New Radio, NR, which may also be known as fifth generation, 5G, radio access technology and MulteFire. For example, in the context of LTE, BS 120 may be referred to as eNB while in the context of NR, BS 120 may be referred to as gNB. In any case, embodiments of the present disclosure are not restricted to any particular wireless technology. Instead, embodiments may be exploited in any beam-based wireless communication system comprising multiple TRPs.

BS 120 may be connected, directly or via at least one intermediate node, with core network 130 via interface 125. Core network 110 may be, in turn, coupled via interface 135 with another network (not shown in FIG. 1), via which connectivity to further networks may be obtained, for example via a worldwide interconnection network. BS 120 may be connected with at least one other BS as well via an inter-base station interface (not shown in FIG. 1), even though in some embodiments the inter-base station interface may be absent. BS 120 may be connected, directly or via at least one intermediate node, with core network 130 or with another core network.

In some example embodiments of the present disclosure, the exemplary network scenario may comprise a relay instead of, or in addition to, UE 110 and/or BS 120. Relaying may be used for example when operating on millimeter-wave frequencies. One example of the relay may be an Integrated Access and Backhaul, IAB, node. The IAB node may be referred to as a self-backhauling relay as well. Another example of a relay may be an out-band relay. In general, the relay node may comprise two parts:

1) Distributed Unit, DU, part which may facilitate functionalities of BS 120, such as a gNB. Thus, in some example embodiments, the DU part of a relay may perform tasks of BS 120.
2) Mobile Termination, MT, part which may facilitate functionalities of a UE, i.e., a backhaul link which may be the communication link between a parent node (DU), such as a DU part of BS 120, and the relay, such as an IAB node. In some embodiments, the MT part may be referred to as a IAB-UE as well, i.e., the relay may correspond to a UE partly and perform tasks of UE 110.

Beam-based operation may be particularly useful at higher carrier frequencies (such as above 6 GHz), because UEs operating on such frequencies are typically equipped with one or multiple antenna arrays or antenna modules per digital input and both transmission and reception beam pattern per digital input are more narrow than omni-directional beam pattern typically used at below 6 GHz. Nevertheless, example embodiments of the present disclosure may be applied in any beam-based wireless communication system, regardless of the used carrier frequency.

Quasi Co-Location, QCL, indication functionality may be exploited for beam management. Two antenna ports may be considered as QCL'ed if properties of a channel over which a symbol is transmitted via a first antenna port can be derived from a channel over which a symbol is transmitted via a second antenna port. Regarding downlink beam indication, QCL indication functionality may be defined as follows. The principle to receive a certain physical signal or physical channel may be that UE 110 is either configured with or UE 110 implicitly determines a source/reference signal that UE 110 has received and measured earlier which defines how to set a RX beam of UE 110 (e.g. when QCL typeD is configured) for the reception of the downlink (target) physical signal or channel to be received. To provide UE 110 with QCL characteristics for the target signal (to be received) a Transmission Configuration Indication, TCI, framework may be used.

According to the TCI framework UE 110 may be configured with TCI state(s) to provide UE 110 with source Reference Signal(s), RS(s), for determining QCL characteristics. Each TCI state may include for example one or two source RSs that provide UE QCL TypeA, TypeB, TypeC and/or TypeD parameters, e.g., as follows:

QCL-TypeA: {Doppler shift, Doppler spread, average delay, delay spread}
QCL-TypeB: {Doppler shift, Doppler spread}
QCL-TypeC: {Doppler shift, average delay}
QCL-TypeD: {Spatial Rx parameter}

TCI states may be transmitted to UE 110 in a downlink control message for example, the downlink control message comprising configurations such as QCL-relationships between the Downlink, DL, RSs in one Channel State Information-Reference Signal, CSI-RS, set and the Physical Downlink Shared Channel, PDSCH, Demodulation Reference Signal, DMRS, ports. For instance, UE 110 may be configured with multiple TCI state configurations and each TCI state may contain parameters for configuring a QCL relationship between one or two DL RSs. Moreover, the TCI state of a Control Resource Set, CORESET, may be provided to UE 110 using Radio Resource Control, RRC, or Medium Access Control, MAC, signaling.

In Release 16, the SCell BFR was specified by the 3rd Generation Partnership Project, 3GPP. In case of Scell Beam Failure Recovery, BFR, UE 110 may perform Beam Failure Detection, BFD, for one or more SCells that have been configured for BFD. The BFD procedure is similar to release 15 PCell BFD, i.e., for each SCell configured for BFD, UE 110 may determine a set of BFD resources. The set of BFD resources may be a set of BFD RSs, denoted by q0, which may be configured in implicit or explicit manner. In case of implicit configuration, UE 110 may determine the BFD RSs based on the RS indicated by the active TCI states for Physical Downlink Control Channel, PDCCH, for a CORESET. In the explicit configuration, UE 110 performs BFD according to the RS configured by the network.

It may be determined on the physical layer/L1 of UE 110 based on a DL RS, such as Synchronization Signal and Physical Broadcast Channel Block, SSB/CSI-RS in the set of q0 (set of BFD resources) whether or not to indicate a Beam Failure Instance, BFI, to a higher layer (MAC/L2). If all of the BFD RSs in the set of q0 are in failure condition, e.g., the hypothetical Physical Downlink Control Channel, PDCCH, Block Error Ratio, BLER, estimated on the RS is above a threshold value (Qout, e.g. 10%), UE 110 may indicate the BFI to the higher layer.

The MAC layer may count, using a BFI counter, the BFI indications for each respective cell and if the MAC layer counts that the configured number of BFI instances indicated by the lower layer for the respective cell (PCell/SCell) is above a threshold, the MAC layer initiates/triggers BFR. The BFI counter may be supervised by a BFD timer. That is, each time UE 110 receives a new BFI indication at the MAC layer, the BFD timer may be started and the BFI counter incremented. If the BFD timer expires, the BFI counter may be reset.

In Release 17, RANI group of the 3GPP has agreed to enhance the BFR procedure to cover the mTRP operation. With reference to FIG. 1 again, mTRP operation may refer to operation where UE 110 is served using one or more TRPs, such as BS 120 in FIG. 1. The mTRP operation may comprise Single Downlink Control Information, S-DCI, or multi Downlink Control Information, mDCI, operation. In mDCI operation, a CORESETPoolIndex value may be used to group CORESETs under separate groups, i.e., when some Control Resource Sets, CORESETs, share the same group identity or CORESETPoolindex value, such CORESETs may be considered to be in the same group. In S-DCI operation the different CORESETs are not grouped, i.e., the same CORESETpoolindex value may be configured for all the CORESETs.

If UE 110 is configured with more than one value of CORESETpoolindex, i.e., configured for mDCI operation, UE 110 may be expected to monitor DCI transmissions simultaneously from CORESETs associated with different pool index values. For instance, up to 2 values may be configured (k=0, 1).

For mTRP BFD, support for independent BFD-RS configuration per-TRP may be required, where each TRP is associated with a BFD-RS set. In case of mDCI based mTRP, the CORESETs may be associated with a CORESETPoolIndex by higher layer configuration, wherein each CORESET may have either value K=0, 1. Based on the Poolindex value, UE 110 may be able to determine the DL RS indicated by the TCI State to be included in the respective set of q0. That is, the BFD-RS set may be CORESETPoolindex specific. However, in case of S-DCI based mTRP, the CORESETPoolIndex may not be configured for UE 110 and hence, implicit configuration of multiple BFD-RS sets is not straightforward.

In case of S-DCI based mTRP, each CORESET may be assigned an explicit value, similar to CORESETPoolIndex, k=0 or k=1, for BFD purposes. The explicit value may associate a DL RS indicated by an active TCI State for a CORESET to the respective set of q0. However, such approach would still require a higher layer configuration of the explicit value per each CORESET by RRC signalling, and any modification to the value with respect to the BFD-RS configuration would require higher layer signalling. Embodiments of the present disclosure therefore enable configuration of BFD for mTRP scenarios when S-DCI is used, without requiring higher layer signalling.

Figure 2:
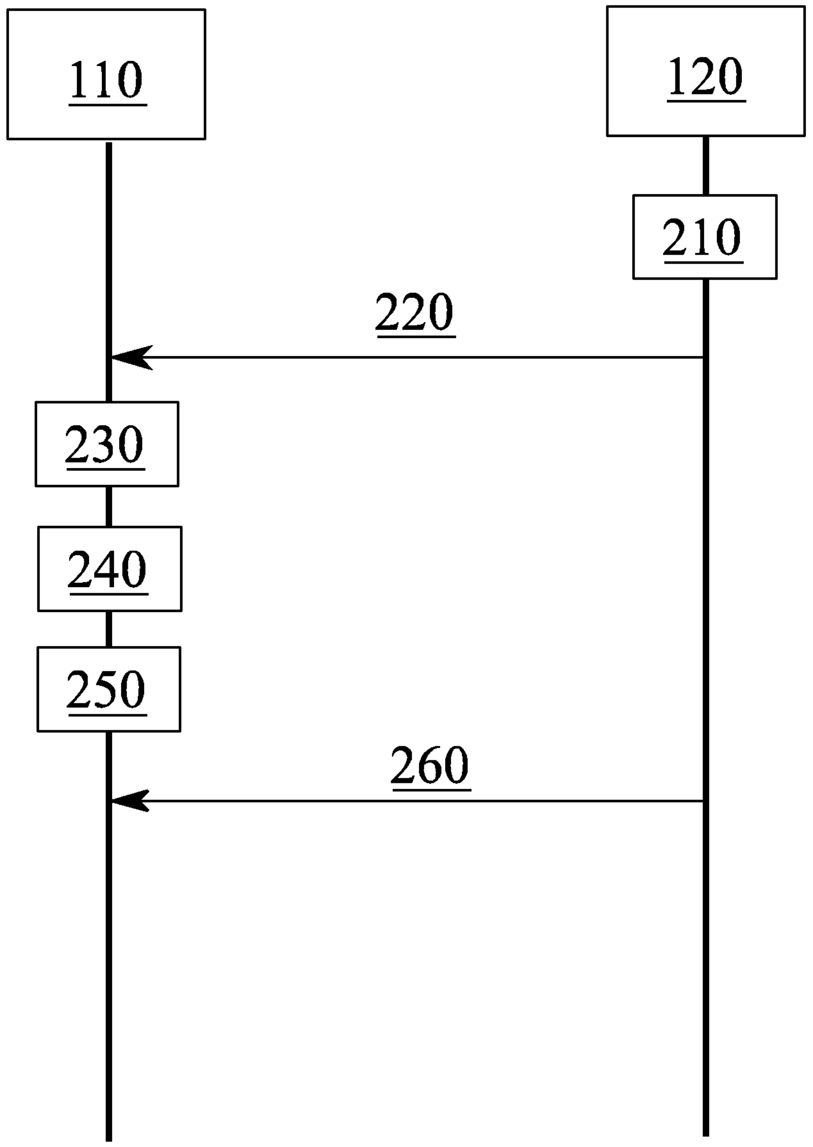
FIG. 2 illustrates a process in accordance with at least some embodiments.

FIG. 2 illustrates a process in accordance with at least some embodiments. On the vertical axes are disposed, from the left to the right, UE 110 and BS 120 of FIG. 1. Time advances from the top towards the bottom. UE 110 and BS 120 may be configured to operate in the mTRP scenario using S-DCI.

At step 210, BS 120 may determine a BFD configuration for UE 110. The configuration may be a configuration for the mTRP scenario when S-DCI is used. For instance, said configuration may comprise a first TCI state and a second TCI state. At step 220, BS 120 may transmit the configuration to UE 110, for example in S-DCI. In some embodiments, configuration may refer to activation as well. At step 230, UE 110 may determine that it is configured/activated with more than one TCI State for a CORESET. Alternatively, UE 110 may determine, at step 230, that it is configured/activated with at least two linked search space sets and one TCI state for each of the linked search space sets. Alternatively, UE 110 may determine, at step 230, that it is configured/activated with at least two TCI states for PDSCH reception. The at least two TCI states may comprise a first TCI state and a second TCI state.

Upon said determination, UE 110 may assume or determine, at step 240, that the DL RS indicated by the first TCI State is to be included in a first set of q0, i.e., first set of BFD resources, and the second TCI State to a second set of q0, i.e., second set of BFD resources. At step 250, UE 110 may include the DL RS indicated by the first TCI state to the first set of BFD resources and the DL RS indicated by the second TCI state to the second set of BFD resources. At step 260, UE 110 may perform BFD by monitoring beams 115 in accordance with the first set and the second set.

In some embodiments, CORESET beams may be used when more than one TCI state activated for CORESET (e.g., when S-DCI is sent on a PDCCH in a Single Frequency Network, SFN). At step 230, UE 110 may determine that it is configured/activated with more than one TCI State for a CORESET. In such a case, the first TCI state may be a state with a highest or a lowest index and the second TCI state may be a state with a second highest or a second lowest index, respectively. If an indicated TCI state, such as the first and/or the second TCI state, has two QCL source RSs configured, UE 110 may assume or determine for both the QCL typeD (QCL type comprising spatial receiver parameters) RS to be included for respective sets. That is, UE 110 may assume or determine that the QCL typeD is to be included to the first and the second sets when at least two QCL source RSs are configured for at least two TCI states.

If UE 110 is configured/activated with the at least two TCI states for one CORESET and also for multiple CORESETs, UE 110 may include for each of the CORESETs the DL RS indicated by the TCI States to respective sets of q. That is, UE 110 may determine that it is configured with at least two TCI states for each of at least two CORESETs and assume or determine that the DL RS indicated by the first TCI state is to be included to the first set of BFD resources of each of the at least two CORESETs and the DL RS indicated by the second TCI state is to be included to the second set of BFD resources of each of the at least two CORESETs.

UE 110 may determine the BFD-RS set inclusion based on a signalled order in a TCI state MAC Control Element, CE. For instance, the DL RS of the TCI State that is indicated first in the MAC CE may be included to the first set and the DL RS of the TCI state that is indicated second in the MAC CE may be included in the second set. That is, UE 110 may receive from BS 120 a first indication indicating that the downlink reference signal indicated by the first TCI state is to be included to the first set of BFD resources and a second indication indicating that the downlink reference signal indicated by the second TCI state is to be included to the second set of BFD resources. The first indication and the second indication may be received in the MAC CE.

UE 110 may assume or determine the implicit BFD-RS configuration/inclusion of the DL RS indicated by respective TCI states for different sets of q0, when more than one TCI State is activated for a CORESET and the DL RS have different QCL source RSs, i.e., different SSBs. Alternatively, or in addition, UE 110 may assume or determine the implicit BFD-RS configuration/inclusion of the DL RS indicated by respective TCI states for different sets of q0, when more than one TCI State is activated for a CORESET and the DL RS have different QCL source RS types (typeD) That is, in general UE 110 may assume or determine that the DL RS indicated by the first TCI state is to be included to the first set of BFD resources and the DL RS indicated by the second TCI state is to be included to the second set of BFD resources when the DL RSs have different source reference signals, such as different SSBs or different types.

When UE 110 has been configured or it has determined that multiple sets of BFD-RS are used for BFD monitoring, UE 110 may perform BFD per respective sets of BFD-RS. That is, UE 110 may perform BFD procedure based on the respective sets of BFD-RS. The BFD monitoring at the MAC layer may use the same parameters, such as the BFD timer and/or BFI counter, for each of the monitored sets or the parameters may be individually/independently configured per BFD procedure. Hence, UE 110 may monitor air interface for BFD using same parameters for the first and the second set or it may determine to use the individually configured parameters. In one example to determine that MAC layer (of UE 110) may be required to perform BFD monitoring based on multiple sets of q0, the lower layers may indicate to the MAC layer that 2 different indications are provided (and indications may be monitored using respective counters per indication or the indication may be jointly counted). In one example to determine at UE 110, at MAC layer that it is required to detect beam failure on multiple sets of q0 (e.g. two), the MAC layer may implicitly determine such operation if it receives TCI State activation MAC CE containing activation for 2 TCI States for a CORESET. In one example, the BFD may be preconfigured (e.g. parameters for multiple sets of BFD resources, such as first and second BFD-RS set, BFD monitoring may be preconfigured) and the second set of values/procedure activated when at least one BFD-RS is included in the second set of q0. Alternatively, the multiple BFD-RS set based BFD monitoring may be configured by network and UE 110 may determine the BFD-RS to be included in the respective sets according to the methods described herein.

The implicit BFD-RS configuration may be a configurable parameter and configured per Bandwidth Part, BWP, for example. That is, UE 110 may receive a configuration configuring the user equipment to assume or determine that the DL RS indicated by the first TCI state is to be included to the first set of BFD resources and the DL RS indicated by the second TCI state is to be included to the second set of BFD resources. As an example, the BFD (and inclusion of RS to respective sets of BFD-RSs) may be configured per BWP, e.g., for BWP1 UE 110 may assume or determine this operation and for BWP2 UE 110 may assume or determine that this operation is not used. In other words, network may configure UE 110, whether UE 110 is required/should determine to include RS to multiple sets of q0 (BFD-RS set) perform BFD.

The implicit BFD-RS configuration for multiple sets may be configurable and when UE 110 is not configured to include BFD-RS to multiple sets, UE 110 may include both, the first and the second DL RSs indicated by the active TCI states, to the same set of q0. The first and the second DL RSs may be included to the same set if the maximum number of BFD-RS is not exceeded by the activation of the at least two TCI States for a CORESET (e.g. two TCI States are activated for only one CORESET). If the maximum number would be exceeded, UE 110 may determine to include the RS with lower/higher value of TCI State ID to the set or UE 110 may add the DL-RS indicated by the TCI State (until the maximum number is reached) according to ascending/descending order of the TCI State ID or based on the order of the TCI State activation in a MAC CE or MAC CEs configuring/activating the TCI States. That is, UE 110 may determine that a configuration for multiple sets of BFD resource is possible for UE 110, but UE 110 is not configured to include the first and the second DL RSs to said multiple sets. Then UE 110 may include the first and the second DL RSs to the first set or to the second set or include the RS to the set according to rules herein.

If multiple CORESETs are activated with one or more TCI states, for each CORESET at least one of the DL RS indicated by the TCI State may be included to the set of BFD-RSs so that the total maximum number of DL RSs indicated by the active TCI States does not exceed the maximum number of BFD-RS per set of q0. As an example, if a maximum of 2 BFD-RSs could be configured for a set of q0, but UE 110 has been activated with 2 TCI states for each of the two CORESETs (i.e. up to 4 BFD-RS would be configured), UE 110 may include at least one DL RS to the set of BFD-RS per each CORESET. In case UE 110 has to select from two TCI States, UE 110 may determine to include the DL RS indicated by the lowest TCI State index or the first TCI State indicated in the MAC CE to the set of q0.

If UE 110 is configured to implicitly determine BFD-RS based on the activation of more than one TCI State for a CORESET or in general when UE 110 has determined/configured to perform BFD on multiple sets of BFD-RS, UE 110 may assume or determine a candidate beam RS (q1) for a respective set of q0, such as the first or the second set, to be indicated from:

- a SSB time location indices that are actually transmitted in a serving cell (0-63);
- lowest TCI State indexes in a TCI State list for PDCCH (up to the index value of 63/Gbit); and/or
- candidates may be explicitly provided by network (i.e. sets of q1 can be provided by the network, such as by BS 120).

If only one TCI State is indicated for a CORESET, UE 110 may determine to include the DL RS to the first set of q0. UE 110 may also remove the previously indicated RS from the second set. That is, UE 110 may determine, after being configured with the at least two TCI states, that it is configured with one TCI state for the CORESET and remove the DL RS indicated by the second TCI state from the second set of BFD resources. UE 110 may maintain the first and the second sets of q0 as long as at least one of the CORESETs is activated with two TCI States.

In any of the examples herein, if there are two or more RS indexes in a TCI state (i.e. TCI State indicates two or more DL RS), UE 110 may include to the set of (respective) q0 the RS index configured with qcl-Type set to 'typeD' for the corresponding TCI states. In other words, if the TCI state has two RSs, UE 110 may determine to include the one with qcl-typeD (spatial RX) to the set of q0.

In some embodiments, PDSCH beams may used with S-DCI in the mTRP scenario. UE 110 may be activated with PDSCH reception with more than one TCI states, for example in case of S-DCI M-TRP scheme, and receive a MAC-CE activating TCI codepoints where some of the codepoints have two TCI states activated. UE 110 may then assume or determine that the DL RS indicated by the first TCI State of a lowest TCI codepoint having two TCI states is to be included to the first set of q0 and a second TCI State of the same, lowest codepoint is to be included to the second set. That is, UE 110 may assume or determine that the DL RS indicated by the first TCI state of the lowest TCI codepoint is to be included to the first set of BFD resources and the DL RS indicated by the second TCI state of the lowest TCI codepoint is to be included to the second set of BFD resources. If a maximum of two BFD-RSs is configured for a set of q0 for each TRP, UE 110 may further assume or determine the DL RS indicated by the first TCI State of a second lowest TCI codepoint having two TCI states to be included in the first set of q0 and the second TCI State of the same codepoint to the second set.

It should be understood that in any of the examples herein the TRP may comprise of one or more TRPs (e.g. a set of TRPs) each providing one more RS and one or CORESETs.

In some embodiments, UE 110 may determine the BFD-RS set inclusion based on a signalled order in a TCI state MAC CE. That is, UE 110 may assume or determine that the DL RS of the TCI State indicated first in the TCI state MAC CE is to be included to the first set and the DL RS of the TCI State indicated second in the MAC CE is to be included in the second set.

In some embodiments, CORESET beams may be used when linked search space sets (CORESETs) are provided (e.g., PDCCH repetition, non-SFN). If UE 110 is configured with PDCCH repetition mode where two search space sets are linked, UE 110 may be activated with one TCI state for a CORESET and each search space set may be associated with a different CORESET. Search space sets may be linked via various ways such as RRC signalling, MAC CE. Monitoring occasions for linked search space sets may also be linked. In such a case, UE 110 may assume or determine the DL RS indicated by the TCI State of the CORESET corresponds to a lower search space set identity or CORESET identity among said linked search space sets and is to be included to the first set of q0. In addition, UE 110 may assume or determine that the DL RS indicated by the TCI State of the CORESET corresponds to a higher search space set identity or CORESET identity among linked search space sets and is to be included to the second set.

If the PDSCH is also received by UE 110 with mTRP mode, UE 110 may assume that the DL RS indicated by the first TCI State of a lowest TCI codepoint having two TCI states is to be included to the first set of q0 and a second TCI State of the same, lowest codepoint is to be included to the second set. That is, UE 110 may assume or determine that the DL RS indicated by the first TCI state of the lowest TCI codepoint is to be included to the first set of BFD resources and the DL RS indicated by the second TCI state of the lowest TCI codepoint is to be included to the second set of BFD resources.

UE 110 may determine the BFD-RS set inclusion based on a signalled order in a TCI state MAC CE used for PDSCH, UE 110 may assume or determine that the DL RS of the TCI state indicated first in the MAC CE is to be included to the first set and the DL RS of the TCI State indicated second in the MAC CE is to be included in the second set.

In some embodiments, inter-cell candidates beam indices may be configured to be SSBs of respective cells.

In any case, regardless of how UE 110 determines/assumes, at step 240, that a DL RS indicated by a first TCI state is to be included to a first set of BFD resources and a DL RS indicated by a second TCI state is to be included to a second set of BFD resources, UE 110 may, at step 250, include the DL RSs to the sets accordingly and then perform BFD using the first and the second sets at step 260.

Figure 3:
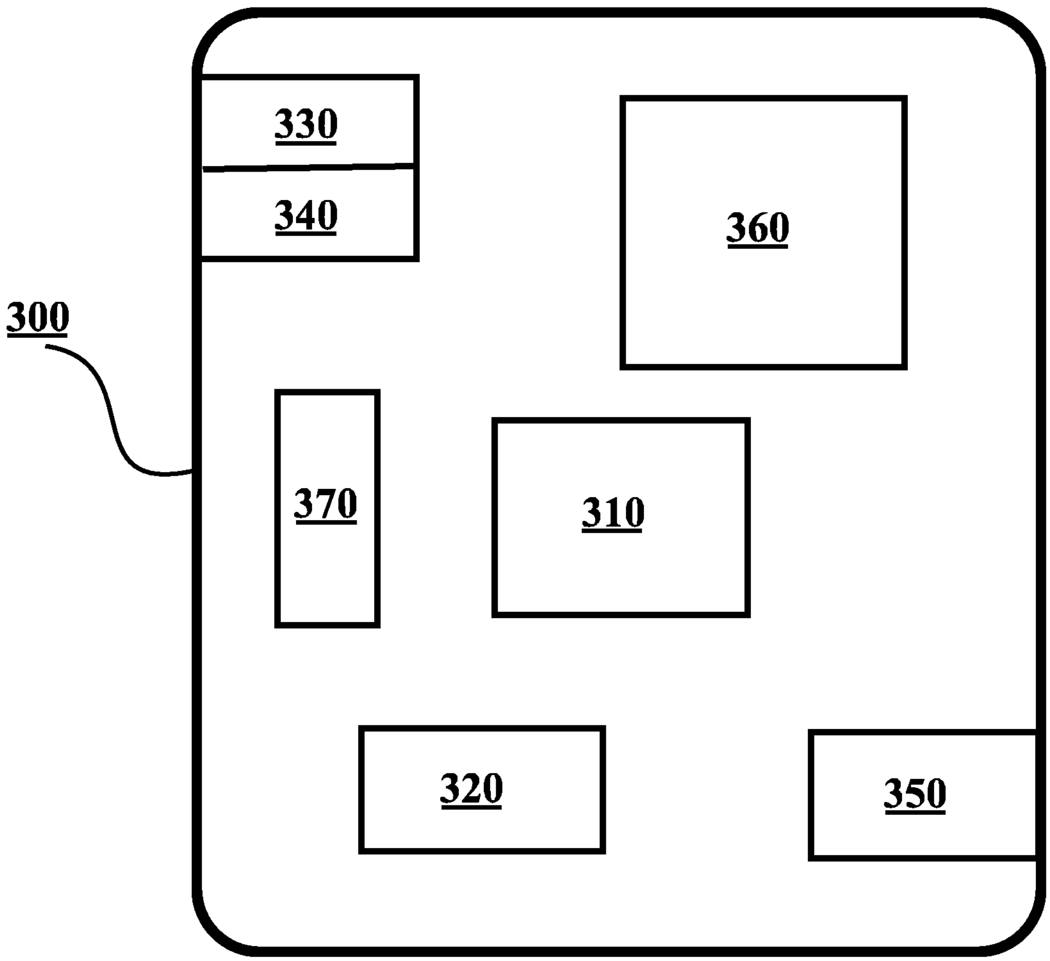
FIG. 3 illustrates an example apparatus capable of supporting at least some embodiments.

FIG. 3 illustrates an example apparatus capable of supporting at least some embodiments. Illustrated is device 300, which may comprise, for example, UE 110, BS 120 or a control device configured to control the functioning thereof, possibly when installed therein. Comprised in device 300 is processor 310, which may comprise, for example, a single- or multi-core processor wherein a single-core processor comprises one processing core and a multi-core processor comprises more than one processing core. Processor 310 may comprise, in general, a control device. Processor 310 may comprise more than one processor. Processor 310 may be a control device. A processing core may comprise, for example, a Cortex-A8 processing core manufactured by ARM Holdings or a Steamroller processing core produced by Advanced Micro Devices Corporation. Processor 310 may comprise at least one Qualcomm Snapdragon and/or Intel Atom processor. Processor 310 may comprise at least one application-specific integrated circuit, ASIC. Processor 310 may comprise at least one field-programmable gate array, FPGA. Processor 310 may be means for performing method steps in device 300. Processor 310 may be configured, at least in part by computer instructions, to perform actions.

A processor may comprise circuitry, or be constituted as circuitry or circuitries, the circuitry or circuitries being configured to perform phases of methods in accordance with embodiments described herein. As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 300 may comprise memory 320. Memory 320 may comprise random-access memory and/or permanent memory. Memory 320 may comprise at least one RAM chip. Memory 320 may comprise solid-state, magnetic, optical and/or holographic memory, for example. Memory 320 may be at least in part accessible to processor 310. Memory 320 may be at least in part comprised in processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with Global System for Mobile communication, GSM, Wideband Code Division Multiple Access, WCDMA, Long Term Evolution, LTE, and/or 5G/NR standards, for example.

Device 300 may comprise a Near-Field Communication, NFC, transceiver 350. NFC transceiver 350 may support at least one NFC technology, such as Bluetooth, Wibree or similar technologies.

Device 300 may comprise User Interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to accept incoming telephone calls, to originate telephone calls or video calls, to browse the Internet, to manage digital files stored in memory 320 or on a cloud accessible via transmitter 330 and receiver 340, or via NFC transceiver 350, and/or to play games.

Device 300 may comprise or be arranged to accept a user identity module 370. User identity module 370 may comprise, for example, a Subscriber Identity Module, SIM, card installable in device 300. A user identity module 370 may comprise information identifying a subscription of a user of device 300. A user identity module 370 may comprise cryptographic information usable to verify the identity of a user of device 300 and/or to facilitate encryption of communicated information and billing of the user of device 300 for communication effected via device 300.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some embodiments, device 300 lacks at least one device described above. For example, some devices 300 may lack a NFC transceiver 350 and/or user identity module 370.

Processor 310, memory 320, transmitter 330, receiver 340, NFC transceiver 350, UI 360 and/or user identity module 370 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the embodiments.

Figure 4:
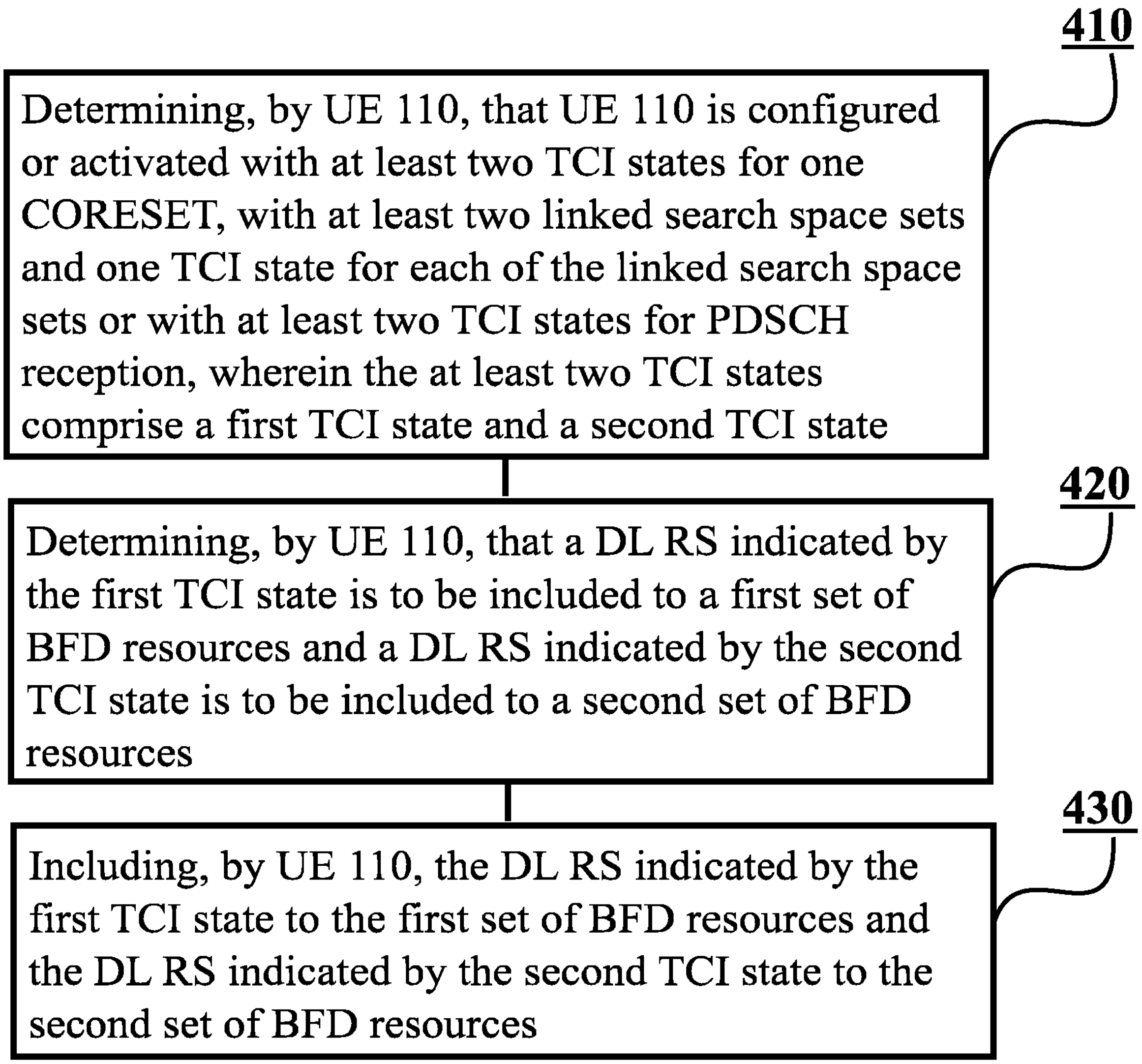
FIG. 4 illustrates a flow graph of a method in accordance with at least some embodiments.

FIG. 4 is a flow graph of a method in accordance with at least some embodiments. The phases of the illustrated method may be performed by UE 110 or by a control device configured to control the functioning thereof, possibly when installed therein. In some embodiments, UE 110 may be a MT part of a relay. UE 110 may be configured to operate in a mTRP scenario using S-DCI.

The method may comprise, at step 410, determining, by UE 110, that UE 110 is configured or activated with at least two TCI states for one CORESET, with at least two linked search space sets and one TCI state for each of the linked search space sets or with at least two TCI states for PDSCH reception, wherein the at least two TCI states comprise a first TCI state and a second TCI state. The method may also comprise, at step 420, determining, by UE 110, that a DL RS indicated by the first TCI state is to be included to a first set of BFD resources and a DL RS indicated by the second TCI state is to be included to a second set of BFD resources. Finally, the method may include, at step 430, including, by UE 110, the DL RS indicated by the first TCI state to the first set of BFD resources and the downlink reference signal indicated by the second TCI state to the second set of BFD resources.

It is to be understood that the embodiments disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and examples may be referred to herein along with alternatives for the various components thereof. It is understood that such embodiments, examples, and alternatives are not to be construed as de facto equivalents of one another, but are to be considered as separate and autonomous representations.

In an exemplary embodiment, an apparatus, such as, for example, UE 110, BS 120, or a control device configured to control the functioning thereof, possibly when installed therein, may comprise means for carrying out the embodiments described above and any combination thereof.

In an embodiment, a computer program may be configured to cause a method in accordance with the embodiments described above and any combination thereof. In an exemplary embodiment, a computer program product, embodied on a non-transitory computer readable medium, may be configured to control a processor to perform a process comprising the embodiments described above and any combination thereof.

In an embodiment, an apparatus, such as, for example, UE 110, BS 120, or a control device configured to control the functioning thereof, possibly when installed therein may comprise at least one processor, and at least one memory including computer program code, wherein the at least one memory and the computer program code are configured to, with the at least one processor, cause the apparatus at least to perform the embodiments described above and any combination thereof.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the disclosure. One skilled in the relevant art will recognize, however, that the disclosure can be practiced without one or more of the specific details, or with other methods, components, materials, etc. In other instances, well-known structures, materials, or operations are not shown or described in detail to avoid obscuring aspects of the disclosure.

While the forgoing examples are illustrative of the principles of the embodiments in one or more particular applications, it will be apparent to those of ordinary skill in the art that numerous modifications in form, usage and details of implementation can be made without the exercise of inventive faculty, and without departing from the principles and concepts of the disclosure. Accordingly, it is not intended that the disclosure be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments find industrial application in cellular communication networks, for example in 3GPP networks, wherein beamforming is used.

| ACRONYMS LIST | |
|---|---|
| 3GPP | 3rd Generation Partnership Project |
| BFD | Beam Failure Detection |
| BFI | Beam Failure Instance |
| BFR | Beam Failure Recovery |
| BLER | Block Error Ratio |
| BS | Base Station |
| CE | Control Element |
| CORESET | Control Resource Set |
| CSI-RS | Channel State Information - Reference Signal |
| DMRS | Demodulation Reference Signal |
| DU | Distributed Unit |
| GSM | Global System for Mobile communication |
| IAB | Integrated Access and Backhaul |
| IoT | Internet of Things |
| LTE | Long-Term Evolution |
| M2M | Machine-to-Machine |
| MAC | Media Access Control |
| mDCI | multi Downlink Control Information |
| MT | Mobile Termination |
| mTRP | multi-TRP |
| NFC | Near-Field Communication |
| NR | New Radio |
| PDCCH | Physical Downlink Control Channel |
| PDSCH | Physical Downlink Shared Channel |
| QCL | Quasi Co-Location |
| RAN | Radio Access Network |
| RAT | Radio Access Technology |
| RRC | Radio Resource Control |
| S-DCI | Single Downlink Control Information |
| SFN | Single Frequency Network |
| SRS | Sounding Reference Signal |
| SSB | Synchronization Signal and Physical Broadcast Channel |
| TCI | Transmission Configuration Indication |
| TRP | Transmission and Reception Point |
| UE | User Equipment |
| UI | User Interface |
| WCDMA | Wideband Code Division Multiple Access |

| REFERENCE SIGNS LIST | |
|---|---|
| 110 | User Equipment |
| 115 | Beams |
| 120 | Base Station |
| 125, 135 | Wired interfaces |
| 130 | Core Network |
| 210-260 | Steps of the process of FIG. 2 |
| 300-370 | Structure of the apparatus of FIG. 3 |
| 410-430 | Phases of the method of FIG. 4 |

The invention claimed is:

1. An apparatus comprising at least one processing core, at least one memory including computer program code, the at least one memory and the computer program code being configured to, with the at least one processing core, cause the apparatus at least to: determine that the apparatus is configured or activated with transmission configuration indication (TCI) states for one control resource set in a single downlink control information (S-DCI) based multi-transmission reception point (mTRP) operation, wherein a control resource set pool index (CORESETPoolIndex) is not configured for the apparatus, with at least two linked search space sets and one TCI state for each of the linked search space sets or with at least two TCI states for physical downlink shared channel (PDSCH) reception, wherein the at least two TCI states comprise a first TCI state and a second TCI state; determine that a downlink reference signal indicated by the first TCI state is to be included to a first set of beam failure detection (BFD) resources and a downlink reference signal indicated by the second TCI state is to be included to a second set of BFD resources, wherein the determination is made without receiving explicit higher layer signaling associating the downlink reference signals to the first set and the second set; include the downlink reference signal indicated by the first TCI state to the first set of BFD resources and the downlink reference signal indicated by the second TCI state to the second set of BFD resources, and determine that the apparatus is configured or activated with the at least two TCI states for PDSCH reception; determine a lowest TCI codepoint that indicates the at least two TCI states for PDSCH reception; and determine that the downlink reference signal indicated by the first TCI state of the lowest TCI codepoint that indicates the at least two TCI states is to be included to the first set of BFD resources and the downlink reference signal indicated by the second TCI state of the lowest TCI codepoint that indicates the at least two TCI states is to be included to the second set of BFD resources, wherein the at least one memory and the computer program code are further configured to, with the at least one processing core, cause the apparatus at least to: determine that the downlink reference signal indicated by the first TCI state of another TCI codepoint that indicates the at least two TCI states is to be included to the first set of BFD resources and the downlink reference signal indicated by the second TCI state of said another TCI codepoint that indicates the at least two TCI states is to be included to the second set of BFD resources, wherein said another TCI codepoint is a second lowest TCI codepoint that indicates the at least two TCI states.

2. The apparatus according to claim 1, wherein the at least one memory and the computer program code are further configured to, with the at least one processing core, cause the apparatus at least to: determine that a quasi co-location (QCL) type comprising spatial receiver parameters is to be included to the first and the second sets when at least two QCL source reference signals are configured for the at least two TCI states, wherein the QCL type comprising spatial receiver parameters is QCL-TypeD, wherein QCL-TypeD is used for determining a receive beam of the apparatus based on spatial QCL with a source reference signal, wherein when the first TCI state has two QCL source reference signals configured, the apparatus includes the reference signal having QCL-TypeD to the first set of BFD resources, and wherein when the second TCI state has two QCL source reference signals configured, the apparatus includes the reference signal having QCL-TypeD to the second set of BFD resources.

3. The apparatus according to claim 1, wherein the at least one memory and the computer program code are further configured to, with the at least one processing core, cause the apparatus at least to: determine that the apparatus is configured with at least two TCI states for each of at least two control resource sets; and determine that the downlink reference signal indicated by the first TCI state is to be included to the first set of BFD resources of each of the at least two control resource sets and the downlink reference signal indicated by the second TCI state is to be included to the second set of BFD resources of each of the at least two control resource sets.

4. The apparatus according to claim 1, wherein the at least one memory and the computer program code are further configured to, with the at least one processing core, cause the apparatus at least to: receive a first indication indicating that the downlink reference signal indicated by the first TCI state is to be included to the first set of BFD resources and a second indication indicating that the downlink reference signal indicated by the second TCI state is to be included to the second set of BFD resources.

5. The apparatus according to claim 1, wherein the at least one memory and the computer program code are further configured to, with the at least one processing core, cause the apparatus at least to: determine that the downlink reference signal indicated by the first TCI state is to be included to the first set of BFD resources and the downlink reference signal indicated by the second TCI state is to be included to the second set of BFD resources when the downlink reference signals have different source reference signals.

6. The apparatus according to claim 1, wherein the at least one memory and the computer program code are further configured to, with the at least one processing core, cause the apparatus at least to: monitor for beam failure detection for the first and the second set, wherein the apparatus performs beam failure detection per respective sets of BFD resources using a beam failure detection timer and a beam failure instance counter, wherein beam failure detection parameters are individually configured per set of BFD resources, wherein the apparatus indicates a beam failure instance to a Medium Access Control (MAC) layer when all BFD reference signals in a respective set are in a failure condition, and wherein each time the apparatus receives a new beam failure instance indication at the MAC layer, the beam failure detection timer is started and the beam failure instance counter is incremented, wherein the apparatus performs a separate beam failure recovery procedure for each of the first and the second sets of BFD resources, wherein the beam failure recovery procedure for a respective set is initiated when the beam failure instance counter for that set reaches a maximum value configured for that set, and wherein the apparatus transmits a beam failure recovery request using a candidate beam reference signal associated with the respective set for which beam failure was detected.

7. The apparatus according to claim 1, wherein the at least one memory and the computer program code are further configured to, with the at least one processing core, cause the apparatus at least to: receive a configuration configuring the apparatus to determine that the downlink reference signal indicated by the first TCI state is to be included to the first set of BFD resources and the downlink reference signal indicated by the second TCI state is to be included to the second set of BFD resources.

8. The apparatus according to claim 1, wherein the at least one memory and the computer program code are further configured to, with the at least one processing core, cause the apparatus at least to: determine that a configuration for multiple sets of BFD resources is configurable; determine that the apparatus is not configured to include the first and the second downlink reference signals to said multiple sets; and include the first and the second downlink reference signals to the first set or to the second set.

9. The apparatus according to claim 1, wherein the at least one memory and the computer program code are further configured to, with the at least one processing core, cause the apparatus at least to: determine, after being configured with the at least two TCI states, that the apparatus is configured with one TCI state for the one control resource set; and remove the downlink reference signal indicated by the second TCI state from the second set of BFD resources.

10. The apparatus according to claim 1, wherein the at least two TCI states indicate at least two quasi co-location types for the at least two downlink reference signals, and wherein at least one quasi co-location type of the at least two quasi co-location types is QCL-TypeD.

11. The apparatus according to claim 10, wherein the at least one memory and the computer program code are further configured to, with the at least one processing core, cause the apparatus at least to: determine a candidate beam reference signal for a respective set of BFD resources from: synchronization signal block (SSB) time location indices that are actually transmitted in a serving cell, lowest TCI state indexes in a TCI state list for physical downlink control channel (PDCCH), and candidates explicitly provided by a network.

12. The apparatus according to claim 1, wherein the at least one memory and the computer program code are further configured to, with the at least one processing core, cause the apparatus at least to: determine that the apparatus is configured or activated with the two linked search space sets, determine associated TCI states corresponding to the two linked search space sets, wherein each search space set is associated with a control resource set, determine that the downlink reference signal indicated by the TCI state of the control resource set corresponds to a lower search space set identity or control resource set identity among linked search space sets and is to be included in the first set of BFD resources; and determine that the downlink reference signal indicated by the TCI state of the control resource set corresponds to a higher search space set identity or control resource set identity among linked search space sets and is to be included in the second set of BFD resources.

13. The apparatus according to claim 1, wherein the at least one memory and the computer program code are further configured to, with the at least one processing core, cause the apparatus at least to: determine that the apparatus is configured or activated with the at least two linked search space sets and one TCI state for each of the linked search space set in a mTRP PDCCH non-SFN scenario, wherein the downlink reference signal indicated by the TCI state of the control resource set corresponding to a lower search space set identity or control resource set identity among the linked search space sets is included in the first set of BFD resources, and the downlink reference signal indicated by the TCI state of the control resource set corresponding to a higher search space set identity or control resource set identity among the linked search space sets is included in the second set of BFD resources.

14. The apparatus according to claim 1, wherein the at least one memory and the computer program code are further configured to, with the at least one processing core, cause the apparatus at least to: determine BFD reference signals jointly when deriving more than one BFD reference signal per transmission reception point; determine that the apparatus is configured or activated with the at least two TCI states in a PDSCH mTRP scenario; receive a Medium Access Control (MAC) Control Element (CE) activating transmission configuration indication (TCI) codepoints, wherein at least one of the TCI codepoints comprises two TCI states activated; and include the downlink reference signal indicated by the first TCI state of a lowest TCI codepoint having the two TCI states to the first set of BFD resources and the downlink reference signal indicated by the second TCI state of the lowest TCI codepoint to the second set of BFD resources, wherein, when a maximum of two BFD reference signals is configured for each set of BFD resources, the apparatus further includes the downlink reference signal indicated by the first TCI state of a second lowest TCI codepoint having two TCI states in the first set of BFD resources and the downlink reference signal indicated by the second TCI state of the second lowest TCI codepoint in the second set of BFD resources.

15. The apparatus according to claim 1, wherein: the determination that the downlink reference signal indicated by the first TCI state is to be included in the first set of BFD resources and the downlink reference signal indicated by the second TCI state is to be included in the second set of BFD resources is an implicit determination performed without receiving explicit higher layer signaling associating the downlink reference signals to the first set and the second set; the implicit determination is configured per bandwidth part (BWP); the implicit determination is made when the downlink reference signals indicated by the first TCI state and the second TCI state have different quasi co-location (QCL) source reference signals; when a TCI state of the at least two TCI states indicates two or more downlink reference signals, the apparatus includes the reference signal configured with QCL-TypeD in the respective set of BFD resources; the apparatus performs beam failure detection per respective sets of BFD resources using a beam failure detection timer and a beam failure instance counter; and the apparatus maintains the first and the second sets of BFD resources as long as at least one control resource set is activated with two TCI states.

16. A method, comprising: determining, by a user equipment, that the user equipment is configured or activated with at least two transmission configuration indication (TCI) states for one control resource set in a single downlink control information (S-DCI) based multi-transmission reception point (mTRP) operation, wherein a control resource set pool index (CORESETPoolIndex) is not configured for the user equipment, with at least two linked search space sets and one TCI state for each of the linked search space sets or with at least two TCI states for physical downlink shared channel (PDSCH) reception, wherein the at least two TCI states comprise a first TCI state and a second TCI state; determining, by the user equipment, that a downlink reference signal indicated by the first TCI state is to be included to a first set of beam failure detection (BFD) resources and a downlink reference signal indicated by the second TCI state is to be included to a second set of BFD resources, wherein the determination is made without receiving explicit higher layer signaling associating the downlink reference signals to the first set and the second set; including, by the user equipment, the downlink reference signal indicated by the first TCI state to the first set of BFD resources and the downlink reference signal indicated by the second TCI state to the second set of BFD resources and determine that the apparatus is configured or activated with the at least two TCI states for PDSCH reception; determine a lowest TCI codepoint that indicates the at least two TCI states for PDSCH reception; and determine that the downlink reference signal indicated by the first TCI state of the lowest TCI codepoint that indicates the at least two TCI states is to be included to the first set of BFD resources and the downlink reference signal indicated by the second TCI state of the lowest TCI codepoint that indicates the at least two TCI states is to be included to the second set of BFD resources, wherein the at least one memory and the computer program code are further configured to, with the at least one processing core, cause the apparatus at least to: determine that the downlink reference signal indicated by the first TCI state of another TCI codepoint that indicates the at least two TCI states is to be included to the first set of BFD resources and the downlink reference signal indicated by the second TCI state of said another TCI codepoint that indicates the at least two TCI states is to be included to the second set of BFD resources, wherein said another TCI codepoint is a second lowest TCI codepoint that indicates the at least two TCI states.

17. The method according to claim 16, further comprising: determining, by the user equipment, that a quasi co-location (QCL) type comprising spatial receiver parameters is to be included to the first and the second sets when at least two QCL source reference signals are configured for the at least two TCI states.

18. The method according to claim 16, further comprising: determining, by the user equipment, that the user equipment is configured with the at least two TCI states for each of at least two control resource sets; determining, by the user equipment, that the downlink reference signal indicated by the first TCI state is to be included to the first set of BFD resources of each of the at least two control resource sets and the downlink reference signal indicated by the second TCI state is to be included to the second set of BFD resources of each of the at least two control resource sets; and receiving, by the user equipment, a first indication indicating that the downlink reference signal indicated by the first TCI state is to be included to the first set of BFD resources and a second indication indicating that the downlink reference signal indicated by the second TCI state is to be included to the second set of BFD resources.

19. A non-transitory computer readable medium having stored thereon a set of computer readable instructions that, when executed by at least one processor, cause an apparatus to at least perform: determining that the apparatus is configured or activated with at least two transmission configuration indication (TCI) states for one control resource set in a single downlink control information (S-DCI) based multi-transmission reception point (mTRP) operation, wherein a control resource set pool index (CORESETPoolIndex) is not configured for the apparatus, with at least two linked search space sets and one TCI state for each of the linked search space sets or with at least two TCI states for physical downlink shared channel (PDSCH) reception; determining that a downlink reference signal indicated by a first TCI state is to be included to a first set of beam failure detection (BFD) resources and a downlink reference signal indicated by a second TCI state is to be included to a second set of BFD resources, wherein the determination is made without receiving explicit higher layer signaling associating the downlink reference signals to the first set and the second set; including the downlink reference signal indicated by the first TCI state to the first set of BFD resources and the downlink reference signal indicated by the second TCI state to the second set of BFD resources and determine that the apparatus is configured or activated with the at least two TCI states for PDSCH reception; determine a lowest TCI codepoint that indicates the at least two TCI states for PDSCH reception; and determine that the downlink reference signal indicated by the first TCI state of the lowest TCI codepoint that indicates the at least two TCI states is to be included to the first set of BFD resources and the downlink reference signal indicated by the second TCI state of the lowest TCI codepoint that indicates the at least two TCI states is to be included to the second set of BFD resources, wherein the at least one memory and the computer program code are further configured to, with the at least one processing core, cause the apparatus at least to: determine that the downlink reference signal indicated by the first TCI state of another TCI codepoint that indicates the at least two TCI states is to be included to the first set of BFD resources and the downlink reference signal indicated by the second TCI state of said another TCI codepoint that indicates the at least two TCI states is to be included to the second set of BFD resources, wherein said another TCI codepoint is a second lowest TCI codepoint that indicates the at least two TCI states.

* * * * *